United States Patent [19]

Nebergall et al.

[11] Patent Number: 5,468,701
[45] Date of Patent: Nov. 21, 1995

[54] PROCESS FOR REGENERATING SPENT ACID-ACTIVATED BENTONITE CLAYS AND SMECTITE CATALYSTS

[75] Inventors: Robert S. Nebergall, Lombard; Dennis R. Taylor, Palatine; Carolyn J. Kucharz, Chicago, all of Ill.

[73] Assignee: American Colloid Company, Arlington Heights, Ill.

[21] Appl. No.: 247,259

[22] Filed: May 23, 1994

Related U.S. Application Data

[62] Division of Ser. No. 17,382, Feb. 12, 1993, Pat. No. 5,358,915.

[51] Int. Cl.[6] .............................. B01J 20/34; B01J 38/60
[52] U.S. Cl. ................... 502/80; 502/22; 502/23; 502/27; 502/31; 502/33; 502/81
[58] Field of Search .................. 502/80, 81, 27, 502/22, 23, 25, 28, 31, 33

[56] References Cited

U.S. PATENT DOCUMENTS

| | | |
|---|---|---|
| 1,544,210 | 6/1925 | Bierce . |
| 1,562,550 | 11/1925 | Hall ........................................ 502/45 |
| 1,654,629 | 1/1928 | Baylis ..................................... 502/51 |
| 1,763,167 | 6/1930 | Lowery ................................... 502/25 |
| 1,806,690 | 5/1931 | Kroner et al. ........................ 423/335 |
| 1,822,303 | 9/1931 | Miller .................................... 502/38 |
| 2,236,679 | 4/1941 | Ferguson et al. ..................... 252/279 |
| 2,246,127 | 6/1941 | Davis ....................................... 303/3 |
| 2,449,016 | 9/1948 | Simpson et al. ...................... 196/147 |
| 2,458,433 | 1/1949 | Simpson ............................... 252/418 |
| 2,854,406 | 9/1958 | Defoe .................................... 208/305 |
| 2,892,800 | 6/1959 | Taipale ................................. 252/450 |
| 2,981,697 | 4/1961 | Mickelson et al. .................. 252/450 |
| 3,472,786 | 10/1969 | Urban et al. ........................ 252/414 |
| 3,725,299 | 4/1973 | Turnock et al. ................... 252/411 S |
| 4,094,815 | 6/1978 | Cedro, III et al. ................. 252/415 |
| 4,120,782 | 10/1978 | Andeh et al. ....................... 208/305 |
| 4,124,528 | 11/1978 | Modell ............................... 252/411 R |
| 4,179,361 | 12/1979 | Michlmayr .......................... 208/244 |
| 4,353,992 | 10/1982 | Pannekeet ............................ 521/26 |
| 4,469,805 | 9/1984 | Kofke, Jr. et al. ................... 502/33 |
| 4,550,090 | 10/1985 | Degnan et al. ....................... 502/25 |
| 4,650,779 | 3/1987 | Goldstein .............................. 502/38 |
| 4,714,688 | 12/1987 | Dinh et al. ............................ 502/33 |
| 4,717,699 | 1/1988 | Mickelson ............................. 502/83 |
| 4,812,436 | 3/1989 | Staal et al. .......................... 502/407 |
| 4,830,997 | 5/1989 | Trinh et al. ........................... 502/28 |
| 4,956,126 | 9/1990 | Staal et al. .......................... 260/428 |
| 4,961,881 | 10/1990 | Ou ..................................... 260/428.5 |
| 5,087,374 | 2/1992 | Ding ..................................... 210/673 |
| 5,348,915 | 10/1994 | Nebergall et al. ..................... 502/27 |

FOREIGN PATENT DOCUMENTS

| | | |
|---|---|---|
| 605736 | 11/1934 | Germany . |
| 51-065133 | 6/1976 | Japan . |
| 50153 | 4/1941 | Netherlands . |
| 1278379 | 6/1972 | United Kingdom . |
| 2189233 | 10/1987 | United Kingdom . |

OTHER PUBLICATIONS

Watson, et al., "Use or Disposal of By–Products and Spent Material from the Vegetable Oil Processing Industry in the U.S.," *J. Am. Oil Chemists' Soc.*, vol. 53, pp. 437–442 (Jun. 1976).

Svensson, "Use or Disposal of By–Products and Spent Material from the Vegetable Oil Processing Industry in Europe," *J. Am. Oil Chemists' Soc.*, vol. 53, pp. 443–445 (Jun. 1976).

Bahl, et al. "Regeneration of Bleaching Clays," *Research and Industry*, vol. 22, pp. 145–149 (Sep. 1977).

Penninger, "Extraction of Oily Matter from Spent Bleaching Earth with Water at Elevated Temperature and Pressure," *J. Chem Tech Biotechnol.*, vol. 29, pp. 154–157 (1979).

Ong, "Oil Recovery from Spent Bleaching Earth and Disposal of the Extracted Material," *JAOCS*, vol. 60, No. 2, p. 266A (Feb. 1983).

Kalam, et al., "Regeneration of Spent Earth by Wet Oxidation," *JAOCS*, vol. 65, No. 9, pp. 1536–1540 (Sep. 1988).

Kalam, et al., "Regeneration of Spent Earth in Aqueous Medium" *JAOCS*, vol. 65, No. 12, pp. 1917–1921 (Dec. 1988).

Waldmann, et al., "De–Oiling Contaminated Bleaching Clay by High–Pressure Extraction," *JAOCS*, vol. 68, No. 12, pp. 922–930 (Dec. 1991).

*Primary Examiner*—Asok Pal
*Attorney, Agent, or Firm*—Marshall, O'Toole, Gerstein, Murray & Borun

[57] ABSTRACT

A three step process for regenerating spent bleaching clays and acid-activated smectite catalyst granules includes: (1) an extraction step to remove a majority of entrained oil, preferably about 75% to about 95% by weight of the entrained oil, when regenerating bleaching clays; (2) an oxidation step to remove the majority of remaining carbonaceous adsorbates which are not removed by the preceding extraction step, and (3) an acid wash step to restore the acidity normally associated with fresh acid-activated bleaching clays. The features of steps 2 and 3 may be combined into a single step by using an appropriate oxidant, for example, a source of acidic protons, such as peracetic acid.

18 Claims, 5 Drawing Sheets

PROCESS FOR REGENERATING SPENT ACID-ACTIVATED BENTONITE CLAYS AND SMECTITE CATALYSTS

CROSS REFERENCE TO RELATED APPLICATION

This application is a divisional of application Ser. No. 08/017,382 filed Feb. 12, 1993 now U.S. Pat. No. 5,358,915.

FIELD OF THE INVENTION

The present invention is directed to a method of regenerating spent acid-activated smectite clays. More particularly, one embodiment the present invention is directed to a method of regenerating an acid-activated clay after the acid-activated clay has been used to remove carotenoid and/or chlorophyll contaminants from oil to restore carotenoid and/or chlorophyll adsorption sites on the acid-activated clay to at least 98% of the original carotenoid and/or chlorophyll adsorption activity. In another embodiment, the present invention is directed to a method of regenerating acid-activated catalyst granules formed from acid-activated smectite clay, such as the granules manufactured in accordance with co-pending Hynes, et al. application Ser. No. 08/011,273, filed Jan. 29, 1993, titled "PROCESS OF ACID BINDING FINE SMECTITE CLAY PARTICLES INTO GRANULES", hereby incorporated by reference.

BACKGROUND OF THE INVENTION

Acid-activated bentonite clays in the form of finely ground powders, commonly called bleaching clays or bleaching earths, are used to adsorb colored pigments, such as carotenoids and chlorophyll, as well as colorless contaminants, such as phospholipids, and hydroperoxides from edible and inedible oils. This process is called "bleaching" and serves both cosmetic and chemical purposes: (i) it reduces color—very clear, almost water white oils are produced that meet with U.S. consumer expectations, and (ii) it stabilizes the oil—both the colored pigments and colorless contaminants tend to destabilize the oil (i.e., cause the oil to become rancid more easily) if they are not removed.

Usually, the bleaching process includes adding a bleaching clay powder to a contaminated oil at levels in the range of about 0.35 to about 3.0 wt. %, depending on the type and quality of oil being processed. The clay/oil mixture then is heated to a temperature in the range of about 90° C. to about 120° C. for about 20 to 30 minutes, after which time the now "spent" clay is separated from the bleached oil by filtration, using filter presses or pressure leaf filters. Typically, the filter cake resulting from the filtration operation contains the pigments and other contaminants removed from the oil, as well as considerable quantities, for example, about 25 to about 40 wt. %, of entrained oil that is difficult to remove from the spent clay.

It is known that when extra processing, such as solvent or lye-extraction, is employed to remove the entrained oil from the spent clay, the extracted oil is of poor quality. In addition, the extra processing involved is both difficult and expensive. Accordingly, most oil refiners choose to dispose of spent bleaching clay from their operations by having it hauled away to landfill sites.

Unfortunately, spent bleaching clays also possess rather high surface areas, for example, about 250 to about 350 $m^2/gm$, and when the spent clays are saturated with entrained oils, they can spontaneously ignite. Because of this pyrophoric tendency, oil-laden spent bleaching clays are classified as hazardous landfill materials and premium rates are levied to dispose of them in landfill sites. From the standpoint of the individual refiner whose margins in this highly competitive industry are tight, these extra expenses are an additional and unwanted burden. From the standpoint of municipalities faced with the problems of acquiring and managing landfill sites, they are becoming increasingly stringent regarding the types of materials they will accept for these sites and striving to encourage recycling as a way of reducing demand. However, even though there has been a long felt need in the industry to recycle the oils and the bleaching clays, until the present invention, there has been no solution to this costly problem.

Although the dosage levels of bleaching clays used to process edible and inedible oils are actually quite low, the magnitude of this problem can be appreciated by considering the fact that about 10 million metric tons of edible and inedible oils were processed in the United States in 1990. At an average dosage level of about 0.75 percent by weight bleaching clay, processing would yield about 75,000 metric tons per year of spent clay plus an additional 30,000 metric tons per year of entrained oils that must be disposed of.

One approach to solving the disposal problems associated with the creation of spent bleaching clays from edible and inedible oil refining processes is to regenerate and recycle the spent clay. Although a number of processes have been described for the purpose of accomplishing this objective, all previous processes suffer from the inability to completely regenerate the spent clay. It is important to appreciate that since bleaching clays are used only once in a batch-type operation, if anything less than complete regeneration is accomplished, the economics of performing the regeneration, coupled with the cumulative loss in bleaching activity, would combine, after only a few cycles, to produce a regenerated clay that would be an unattractive alternative to the use of fresh bleaching clay. Table I shown below can be used to illustrate the loss in cumulative regenerated activity at different (constant) regeneration levels.

TABLE I

| % Regeneration per cycle | % Regenerated activity remaining after cycle | | | | | |
|---|---|---|---|---|---|---|
| | 1 | 2 | 3 | 4 | 5 | 6 |
| 97.5 | 97.5 | 95.1 | 92.7 | 90.4 | 88.1 | 85.9 |
| 95 | 95 | 90.3 | 85.7 | 81.5 | 77.4 | 63.5 |
| 92.5 | 92.5 | 85.6 | 79.1 | 73.2 | 67.7 | 62.6 |
| 90 | 90 | 81.0 | 72.9 | 65.6 | 59.0 | 53.1 |

The use of organic solvents presents a number of environmental and safety problems associated with their use. Included among them are the necessity for having: (1) processing systems which have fire and explosion safeguards; (2) equipment for capturing any vapors that might otherwise escape to the atmosphere; and (3) equipment for separating, purifying and recycling the organic solvents. These requirements all add considerably to the expense of utilizing any regeneration process which might require the use of organic solvents.

The possibility for regenerating spent bleaching earths has been studied by other workers. Bahl and Dayal, *Research and Industry*, 22, 145 (1977), pointed out that the simplest possible method of regenerating bleaching clays after their use in oil refining operations was to subject the oil-soaked clays to a controlled burning operation. They noted, however, that localized overheating of such oil-soaked clays during the burning operation was difficult to control, and further, that no value was derived from the entrained oil. Further, it was reported that with each burning cycle, the activity of the clay declines, and that a portion is lost as fines. Also it was noted that regeneration of finely powdered clays, such as the bleaching powders processed in accordance with the present invention, is rarely economical since the fine powdered clay escapes with the combustion gases during burning.

Simpson, et al. U.S. Pat. Nos. 2,246,127 and 2,449,016 disclose a regeneration procedure for granulated bleaching clays, used to treat petroleum oils, in which at least some residual matter is carbonized and the clay, together with a coating of activated carbon, is a more active adsorbent than the original clay. The Simpson, et al. '127 and '016 patents teach that solvents, used to extract oil from a bleaching clay, are generally not favored commercially because they are too expensive. A number of patents have issued based on organic solvent regeneration, such as disclosed in U.S. Pat. Nos. 2,286,815; 2,370,713; and 3,472,786. Fuege and Janssen, *J. Amer. Oil Chemists' Soc.*, 28, 429 (1951), claim 96–97% regeneration of spent bleaching clays when using polar organic solvents, such as alcohols, ethers, and ketones. However, the degree of regeneration drops to the 79–80% range after about 20 cycles.

Some attempts to regenerate spent bleaching clays use both water and organic solvents during the regeneration process. Zerbe U.S. Pat. No. 2,352,064 discloses treating the clay with benzene and a benzene-alcohol mixture for regenerating spent clay; and then a water treatment. Likewise, Rhenania French Patent No. 869,534 discloses the use of water at the end of the regeneration procedure, after first washing the clay with an organic solvent, such as benzene or toluene, to remove oil and then using a mixed solvent such as benzene and 10% ethanol for extraction of resinous products. Martin U.S. Pat. No. 2,328,158 discloses the use of a blend of about 3 parts naphtha and 1 part of a ketone, and water maintained in a proportion of at least 5% to regenerate spent bleaching clays. Other processes disclose the use of organic solvent extractions in conjunction with high temperature heat treatments for spent clay regeneration, as disclosed in British Patent No. 491,338; Swiss Patent No. 237,380; Indian Patent No. 61,157; and German Patent No. 1,941,758.

More recently, Kalam and Joshi *J. Amer. Oil Chemists' Soc.*, 65, 1917 (1988), report utilizing a hexane extraction step followed by high temperature aqueous regeneration, and point out that although numerous processes for regenerating spent bleaching earths already exist, they are either too complicated or too costly. Because of this, the general practice is still to simply discard the spent, oil-saturated material in landfill sites. In the Kalam and Joshi process, the spent, oil-saturated clay is first extracted with hexane and then dried at 110° C. for six hours to remove all traces of solvent. Afterwards, the clay is autoclaved at temperatures in excess of 235° C. for six hours. Regenerated clay from this process was found to possess about 80% as much bleaching activity as fresh bleaching clay. In a more successful variation of this process *Ibid.*, 65, 1537 (1988), the clay is first extracted with hexane, as before, but then a small partial pressure of oxygen is maintained in the autoclave during the aqueous thermal regeneration. Best results were obtained at low slurry concentrations, e.g., 5 wt. % spent clay, when temperatures were in excess of 200° C., with 0.5 MPa of oxygen partial pressure, and conditions maintained for six hours. 100% regenerations were obtained, and could be maintained at that level through at least four cycles.

Waldmann and Eggers, *Ibid.*, 68, 922 (1991), disclose the use of $CO_2$ under supercritical conditions to extract and regenerate spent bleaching clay. Although good removal of oil was achieved (up to 97% in the case of palm oil), carotenoids present in vegetable oils appear not to be removed by this extraction process. The regenerated clay exhibited excellent (100%) efficiency for removing chlorophyll, but only about 50% as much activity as fresh bleaching clay for removing carotenoids, presumably because carotenoids already present were blocking adsorption sites normally used in the removal of the carotenoids. Model U.S. Pat. No. 4,124,528 discloses a similar process to regenerate spent activated carbon which had been used to treat waste water.

Surprisingly, the process of the present invention for regeneration of bleaching clays eliminates the disadvantages of prior art recycling processes and provides essentially complete regeneration of spent bleaching clays, and acid-activated clay catalysts. The process of the present invention yields a low grade oil from the bleaching clay regeneration process that is suitable for use as a fuel oil, for blending in animal feed, or as a source oil for the production of fatty acids, among other uses.

In accordance with another important aspect of the process of the present invention, granulated acid-activated smectite clay catalysts, e.g., olefin polymerization catalysts and other catalysts, e.g., for alkylation of olefins, in the form of acid-activated smectite clay granules, can be regenerated using the process of the present invention. As disclosed in this Assignee's copending application entitled "PROCESS OF ACID BINDING FINE SMECTITE CLAY PARTICLES INTO GRANULES", Ser. No. 08/022,273, filed Jan. 24, 1993, an acid-activated smectite clay-based catalyst, in granule form, is manufactured by acid binding smaller (fine) smectite particles such that the bound clay particles, in the form of acid-bound granules, have sufficient breaking strength and structural integrity to perform as a olefin polymerization catalyst, with substantially increased yield (≈100%) due to the capability of recycling all fine clay particles produced in grinding. The bentonite clay-based polymerization catalyst is manufactured by adhering together a plurality of smaller acid-activated bentonite clay particles, using a strong mineral acid, such as $H_2SO_4$, as a binder. An acid-activated bentonite clay having a particle size distribution in the range of about 2 microns to about 200 microns, predominantly (>50%) in the range of about 45 microns to about 130 microns, preferably calcium bentonite, having calcium as a predominant exchangeable action, is mixed with a strong mineral acid, preferably $H_2SO_4$, in an amount of about 1% to about 5% by weight, and water, preferably in an amount of about 50% to about 65% by weight to form the catalyst. The mixture is subjected to intensive mixing, curing and drying to form strong particles capable of grinding to a desired particle size distribution, e.g., –6 mesh to +60 mesh, U.S. Sieve Series, to form the catalyst. Fines resulting from the grinding step are completely recycled to the intensive mixing stage of the process to achieve 100% yield. Some adjustment of acid content of the mix may be needed to take into account the acid carried into the mix by recycled fines.

The acid-activated smectite clay-based catalyst granules (e.g., formed from acid-activated calcium bentonite), are primarily useful for treating extraction unit extract streams for recovery of aromatic hydrocarbons free from reactive olefins. The clay-based catalyst is characterized by its mildly acidic catalytic activity and at temperatures of between about 150° C. and about 200° C. (about 300° F. to about 400° F.), the acid sites on the clay promote polymerization and alkylation of olefins. Such acid-activated smectite clay-based granules also can be regenerated in accordance with the process of the present invention.

SUMMARY OF THE INVENTION

The present invention is based on the discovery that a particular three step process can be utilized to completely regenerate a spent bleaching clay and acid-activated granules, e.g., used as a polymerization catalyst. The process of the present invention restores a bleaching clay to at least 98% of its activity for bleaching of carotenoids, particularly β-carotene, and/or chlorophyll. Further, at least two embodiments of the process employ only aqueous solutions throughout, thus alleviating the necessity for expensive fire and explosion safeguards, pollution control equipment, and the separation and purification equipment that would be necessary if organic solvents were utilized in the process. However, organic solvents can be used in the process of the present invention, if so desired.

The process for regenerating spent acid-activated bleaching clays includes: (1) an extraction step to remove a majority of entrained oil, preferably about 75% to about 95% by weight of the entrained oil; (2) an oxidation step to remove the majority of remaining carbonaceous adsorbates which are not removed by the preceding extraction step, and (3) an acid wash step to restore the acidity normally associated with fresh acid-activated bleaching clays. The features of steps 2 and 3 may be combined into a single step by using an appropriate oxidant, for example, a source of acidic protons, such as peracetic acid, and the like.

When used to regenerate granulated acid-activated clays, such as used as a catalyst in the polymerization or alkylation of olefins, the extraction step is unnecessary. Any residual solvent remaining in a spent, granulated acid-activated clay catalyst can be removed easily by heating the spent granules above the vaporization temperature of the solvent or, e.g., allowed to vaporize under ambient drying conditions.

DETAILED DESCRIPTION OF THE PREFERRED EMBODIMENTS

Figure 1:
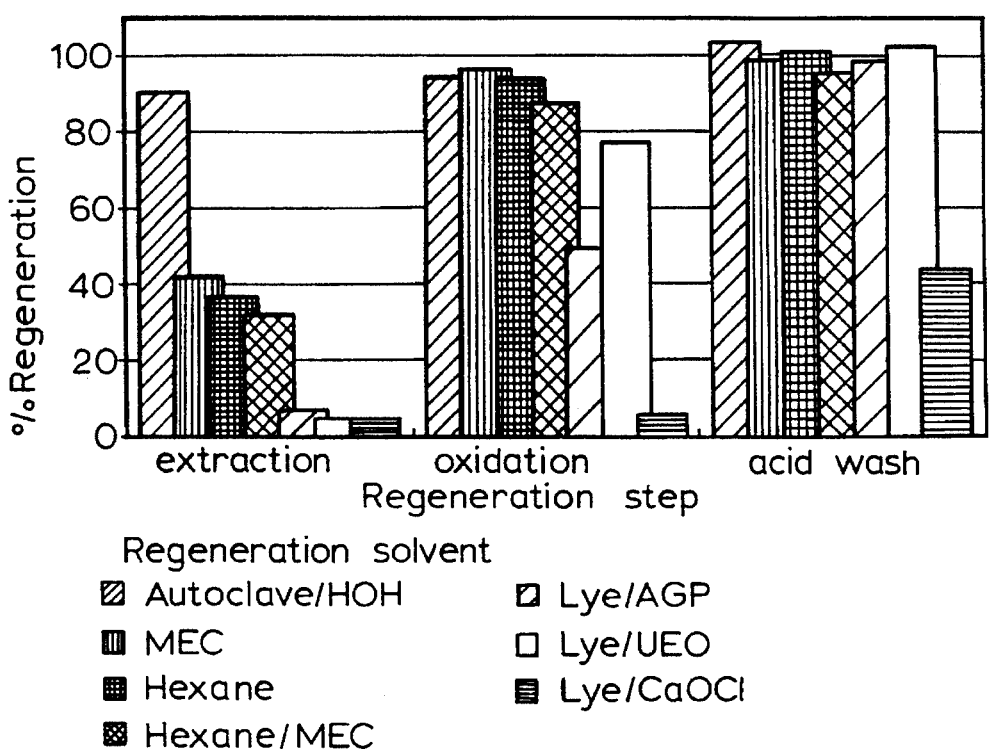
FIGS. 1–10 illustrate the efficacy and importance of oil removal, oxidation and acid wash steps for regenerating clays.

When animal or vegetable oils are treated with bleaching clays, the objective is to reduce the levels of certain trace constituents (including carotenoids, such as β-carotene, pheophytins, chlorophyll, and peroxides, metals, such as iron, magnesium and phosphorous, among others). Color pigments, such as β-carotene (reddish-orange pigment) and chlorophyll (green pigment) should be removed if the oil is to be of suitably light color to meet with consumer acceptance. Peroxides, and other highly reactive molecules, should be removed in order to obtain an oil exhibiting good photolyric and chemical stability (i.e., one which will not rancidify easily). If the concentration of chlorophyll remaining in the oil is above about 100 parts per billion, the oil is considered unacceptable. Similarly, if the Lovibond red value is above about 5, the oil is unacceptable. Additionally, it is desired that levels of free fatty acids, produced when contacting vegetable oils with acid-activated bleaching clays, should not be excessively high, since these constitute a refining loss—a loss of valuable oil by conversion to fatty acids. Free fatty acid levels above about 0.1% by weight are generally considered unacceptable. The process of the present invention achieves at least 98% regeneration for removal of chlorophyll and/or carotenoids, particularly β-carotene (regenerates the acid-activated clay so that it is capable of removing at least 98% of the chlorophyll and/or carotenoids that the clay was capable of removing prior to its last use as an oil bleaching clay).

Those familiar with the art of oil bleaching are aware of quality control tests to monitor oil quality during bleaching. Red and yellow color is commonly monitored using an automatic tintometer according to the procedures listed in the American Oil Chemists' Society Official and Tentative Methods (AOCS Official Method Cc 13b-45) or spectrophotometer (AOCS Official Method Cc 13c-50). Other contaminants which are usually measured include chlorophyll (AOCS Official Method Cc 13d-55); peroxides (AOCS Official Method Cd 8-53; rev. Ja 8-87); and free fatty acids (AOCS Official Method Ca 51-40). In all cases, the lower the values obtained, the better the quality of the resultant oil. Typically, for instance, when bleaching a caustic refined soybean oil, refiners find that chlorophyll reduction is the most important quality parameter and, over time, it has been found that adequate bleaching has occurred if this constituent can be reduced to the 50–90 parts per billion (ppb) range. When this level is obtained, other oil constituents are usually well below the levels required for satisfactory finished oil quality.

If a process for regenerating spent bleaching clay is to be successful on both technical and commercial levels, it will be necessary that regeneration levels very close to the 100% level be achieved.

OIL REMOVAL

The first step in the process of the present invention for regenerating spent bleaching clay is the removal of at least a majority of the oil contained in the spent bleaching clay. A majority of the oil can be removed from the bentonite clay in any manner known in the art. The known high temperature burn method of removal has been shown to provide a regenerated clay that does not have at least 98% of its original activity and, therefore, should not be used for oil removal unless additional oxidation and/or acid washing steps can improve the regenerated activity to the 98% minimum level. Oil entrained in a bleaching clay can be removed, in accordance with the present invention, by solvent extraction, water extraction, autoclave extraction, caustic extraction, and the like. The rate of contact with a liquid extraction medium is not critical—a lower rate requires more time. Suitable solvent contact rates are, for example, about 100 to about 200 milliliters per hour with lower contact rates also being effective but, perhaps, requiring commercially prohibitive times. The following Tables II and III show that each of these extraction methods, followed by oxidation and acid wash steps, provide a regenerated acid-activated clay having at least 98% of its pre-bleaching activity for chlorophyll and/or carotenoids, and preferably about 99% to about 100% of its pre-bleaching chlorophyll and/or carotenoid removal activity.

WATER EXTRACTION

Oil can be separated from the spent bleaching clay using water, as well known in the art, to provide a clay-in-water slurry and a floating oil layer capable of being decanted from the lower clay/water mixture. Water at room temperature will provide some separation of oil, but better separation is achieved using water at elevated temperatures, e.g., about 80° C. to boiling (100° C.). Even better separation of oil from the spent bleaching clay is achieved in an autoclave using steam heating at elevated temperature, e.g., at least about 105° C., and saturated steam pressure, preferably at steam temperature above about 150° C., particularly about 200° C. to about 370° C. with subsequent gravity settling of the clay and decanting of the oil, as disclosed in Penninger, *J. Chem. Tech Biotechnol.* 1979, 29, pages 154–157, hereby incorporated by reference.

AUTOCLAVE EXTRACTION

Autoclave separation was performed in a one gallon container using 0.4 kg. spent clay and 0.6 kg tap water, with heating to 240° C. for one hour while stirring. After one hour, the heat was turned off and the stirring stopped to allow the clay to settle and cool for one hour. Removal of the oily layer was performed after the clay/water slurry had settled in the autoclave, but while still hot, by means of a dip pipe going into the middle of the autoclave. Most of the water was removed from the clay, after oil decanting, by filtration in a centrifuge.

SOLVENT EXTRACTION

Typical solvents useful for extracting oil from a spent acid-activated bleaching clay include non-polar solvents, such as naphtha, benzene or hexane; polar solvents such as acetone, methyl ethyl ketone (MEK) or alcohols, such as ethyl alcohol or anhydrous ethyl alcohol; or a combination of polar and non-polar solvents, such as an equal weight blend of hexane and MEK. Many solvents have been suggested for oil extraction, including alcohols, e.g., $C_1$ to $C_5$ alcohols; ketones; pyridine chlorinated compounds; carbon disulfide and liquid sulfur dioxide. A mixture of polar and non-polar solvents is preferred, since the blend of both polar and non-polar solvents provides solubility of both polar and non-polar contaminants from the oil being bleached. Proportions of solvent and oil-laden spent bleaching clays can vary widely depending upon the speed of extraction desired and the extraction apparatus used. All laboratory extractions used to collect the data of Tables II and III were performed in a Soxhlet extractor. The proportions were 10–15 grams of spent clay per 250–300 milliliters of solvent. Extraction time was 8 hours, with 5–6 cycles of extraction medium per hour. The clay was then dried at 70° C. for 2 hours.

Three solvent systems (aqueous NaOH; autoclave ($H_2O$); and organic solvents) were used for the spent Universal Edible Oil clay samples containing about 25% by weight adsorbed organics (mostly oil); however, the initial indication was that hexane performed the best when used with the subsequent oxidation and acid washing steps of the present invention. Thus, only a hexane extraction was performed on the AGP spent clay samples.

CAUSTIC (LYE) EXTRACTION

The fatty acids in oils can be emulsified by aqueous alkali agents used to separate the oil from the clay. For example, the oil-laden clay can be treated for oil extraction by contact with an alkali solution of 1.25 grams of sodium hydroxide in 100 milliliters of deionized (DI) water, to which 50 grams of the spent clay is added. The data of Tables II and III were obtained at an aqueous NaOH concentration of 2.5% by weight based on the weight of bleaching clay. Svensson, *J. Am. Oil Chemists' Soc.*, June 1976, Vol 53, pages 443–445, hereby incorporated by reference, suggests extraction by suspending the clay in double its weight of water containing 1.5% to 2.5% by weight of concentrated lye (NaOH) based on the weight of bleaching clay. It should be understood that any water-soluble alkali solution can be used to extract the oil from the spent clay so long as the alkali removes a majority of the oil from the clay. Suitable examples include:

Li, Na, K, Mg, Ca, and ammonium hydroxides;

primary, secondary and tertiary water-soluble amines, including up to about 8 C atoms in total; alkanolamines; bicarbonates, e.g., Na, K; carbonates, e.g., Na, K, Mg;

alkaline silicates—Na, K, e.g., sodium metasilicate, sodium orthosilicate, sodium sesquisilicate;

phosphates, such as sodium or potassium tripolyphosphate, tetrasodium or tetrapotassium pyrophosphate, trisodium or tripotassium phosphate, and disodium or dipotassium phosphate; and borax (sodium metraborate), or mixtures thereof.

The mixture then is boiled for at least about 10 minutes, preferably about 20 to about 40 minutes. After slight cooling, the oily liquid layer is decanted, followed by washing of the clay by centrifugation using, for example, four 200 milliliter portions of DI water.

OXIDATION

The spent bleaching clay, as a spent powder or spent granules after the extraction procedure, then is subjected to the oxidation step. The primary oxidation agent used to collect the data of Tables II and III was 30% by weight hydrogen peroxide. Portions of 5–9 grams of the clay were oxidized in 20 milliliters of 30% hydrogen peroxide, with low heat (e.g., 80°–90° C.) applied to initiate the reaction. After the reaction subsided, 5 milliliter increments of 30% hydrogen peroxide were added until a total of 40–50 milliliters were consumed. The oxidized clay then was washed by centrifugation using two 200 milliliter sequential washes with DI water. Calcium hypochlorite was used to oxidize the caustic-extracted Universal Edible Oil samples, however, the results were not as favorable as with 30% by weight hydrogen peroxide in water.

It should be understood that any oxidizing agent can be used for this step, in any concentration, so long as the oxidizing agent does not substantially interfere with the oil bleaching efficacy of the regenerated clay. Examples of oxidants, in addition to $H_2O_2$, that are useful in the oxidation step of the process of the present invention include benzoyl peroxide; calcium hypochlorite; peracetic acid; perchloric acid; potassium perchlorate; potassium permanganate; potassium peroxymonosulfate (OXONE); chlorine; sodium hypochlorite; sodium persulfate; and mixtures thereof.

The amount of oxidant is not critical so long as sufficient oxidant is provided for oxidation of preferably at least 98% of the carbon content (e.g., oil, plus carotene plus lecithin of the spent bleaching clay). Alternatively, oxidation sufficient to break down the carbon compounds to molecules that are capable of being washed from the clay would be sufficient. As earlier indicated, a granule catalyst containing extraction hydrocarbons can be depleted of hydrocarbons simply by evaporative drying. The stoichiometric quantity for complete oxidation of carbon from a bleaching clay can be determined easily by trial and error—if additional oxidant concentration provides additional carotene regeneration, the concentration should be increased. A simple calculation for carbon, with assumptions for the composition of the carbon molecules carried by the spent clay, after theh clay was used to bleach soya oil, is as follows:

1. Determine an average formula for soya oil (assumes mostly $C_{18}$ chain lengths) at: $C_{57}H_{101}O_6$=881 mw; therefore 78 wt. % C 2. Formula for β—carotene at: $C_{32}H_{60}$=444 mw; therefore 86 wt. % C 3. Formula for α-lecithin at: $C_{44}H_{81}PNO_8$=782 mw; therefore 68 wt. % C
4. Assumed that adsorbate mixture on spent bleaching clay before extraction is composed of 50:25:25 mixture of soya oil, β-carotene and α-lecithin
  therefore 0.5(78)+0.25(86)+0.25(68)= 37.5+21.5+17= 76% C
5. Assumed that adsorbate mixture on spent bleaching clay after extraction is composed of 50:50 mixture of β-carotene and α-lecithin therefore 0.5(86)+0.5(68)= 43+34=77% C
6. Also calculated balanced equations for utilization of hydrogen peroxide to exhaustively oxidize the β-carotene and α-lecithin completely to carbon dioxide and water (A) 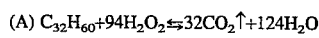

(B) 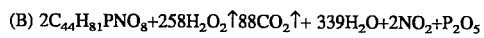

Therefore, if the adsorbate on spent clay after extraction is a 50:50 mixture of these two compounds:

| | | | |
|---|---|---|---|
| assume 7 grams of β-carotene/100 grams spent clay (see Table III - Fresh ACC clay Lovibond red value) | | | |
| or | 7/444 | = | $1.577 \times 10^{-2}$ mole β-carotene |
| need | 94 moles $H_2O_2$ per mole of β-carotene | = | 1.482 moles to completely oxidize β-carotene |
| | $1.482 \times 34$ mw | = | 47.4 grams 100% $H_2O_2$ = 158 grams 30%$H_2O_2$ |
| assume 7 grams of α-lecithin/100 grams of spent clay | | | |
| or | 7/782 | = | $8.95 \times 10^{-3}$ mole α-lecithin |
| need | 129 moles $H_2O_2$ per mole α-lecithin | = | 1.155 moles to completely oxidize α-lecithin |
| | $1.155 \times 34$ mw | = | 37 grams 100% $H_2O_2$ = 123 grams 30%$H_2O_2$ |

Therefore, a total of 158+123=281 grams 30% $H_2O_2$ is required per 100 grams spent clay.

Caustic extraction was performed on both spent clay samples, however, it was necessary to increase the liquid volume for the spent AGP samples, so that 1.85 grams NaOH per 150 milliliters water was used.

ACID WASH

Return of the smectite clay surface, whether in powder form or bound granules, to an acidic state is accomplished by treating the clay with a dilute solution of acid, e.g., sulfuric acid. For bleaching clays used to decolorize oils, the acid treatment is accomplished after oil removal and oxidation steps. The dilute acid content is distinct from the concentrated acid, raised temperature procedure initially used to form an acid-activated clay, such as disclosed in this Assignee's U.S. Pat. No. 4,717,699. Whereas initial acid activation requires slurrying the clay in acid at a concentration above about 10% by weight, the acid regeneration step of the present invention is accomplished by contacting the clay with a dilute acid solution, having an acid concentration less than about 10% by weight acid, preferably about 2% to about 8% by weight acid, more preferably about 3% to about 5% by weight acid. The strength of the restoring acid solution and the degree of acid rinsing, after acid regeneration, are two variables that are established by trial and error to restore sufficient acid bleaching or catalyst activity.

A series of acid-washing treatments with the extracted, oxidized spent Universal Edible Oil bleaching clay samples was performed using a wash solution of 30 milliliters of 5% by weight aqueous sulfuric acid to treat 5.5 grams of clay, followed by rinsing with deionized water to achieve a supernatant wash water having a pH of 3.1 to 3.3 in the final wash water, which is typical of the pH of commercial bleaching clays.

In obtaining the data of Tables II and III, the extracted, oxidized clays were washed with 1.25%, 2.5% and 5.0% by weight strong mineral acid solutions and subsequently rinsed with three 200 milliliter portions of deionized water. Free fatty acid levels were lower with the more dilute washes; however, yellow color and chlorophyll removal ability was decreased slightly with the more dilute washes.

The following Tables and drawings demonstrate the efficacy and the importance of the oil-removal, oxidation and acid wash steps of the process of the present invention for regenerating bleaching clays.

EXAMPLES

Table II presents the results obtained from a series of experiments in which different extraction solvents and oxidants were used to regenerate two different samples of spent bleaching clays obtained from two different edible oil refiners (Universal Edible Oil in Chicago, Ill. and AGP in St. Joseph, Mo.). In these experiments, organic solvents as well as aqueous systems were employed to perform the preliminary extraction step. In order to assess the degree of clay regeneration, the spent clays were subjected to a normal laboratory bleaching evaluation using a once-refined soya oil, and the test methods referred to above. Using the data in this table, the bar graphs of the drawings were prepared. The figures illustrate the changes that occur during the three step sequence of the process of the present invention, and illustrate key features of the invention. The data also shows that the two step process is effective, wherein an acid oxidant (peracetic acid) can be used in a single processing step to achieve oxidation and acid washing while providing sufficient regeneration for adsorption of both carotene and chlorophyll.

TABLE II

EFFECT OF EXTRACTION SOLVENT AND OXIDANT ON REGENERATION OF SPENT BLEACHING CLAY

| TREATMENT | | BLEACHING PROPERTIES VS. PROCESS STEP | | | | | |
|---|---|---|---|---|---|---|---|
| SOLVENT/ REAGENT | STEP | Abs. 470 nm | LvR * 1" cell | LvY ** 1" cell | CHLOROPHYLL ppb | FFA *** wt % | PV **** meq/kg |
| Hexane (1) | extraction | 2.48 | 3.7 | 70 | 423 | 0.02 | 7.5 |
| $H_2O_2$ | oxidation | 0.473 | 1 | 28 | 73.4 | 0.027 | 3.7 |
| $H_2SO_4$ (pH 3.1–3.3) | acid wash | 0.2 | 0.7 | 8.2 | 37.4 | 0.062 | 2.2 |
| MEK (1) | extraction | 2.29 | 3.3 | 70 | 366 | 0.026 | 6.2 |
| $H_2O_2$ | oxidation | 0.364 | 0.9 | 21 | 58.3 | 0.028 | 1.85 |
| $H_2SO_4$ (pH 3.1–3.3) | acid wash | 0.27 | 0.9 | 13 | 46.8 | 0.052 | 1.75 |
| Hexane/MEK (1) | extraction | 2.64 | 3.5 | 70 | 416 | 0.028 | 5.06 |
| $H_2O_2$ | oxidation | 0.678 | 1.3 | 44 | 130 | 0.031 | 3.1 |
| $H_2SO_4$ (pH 3.1–3.3) | acid wash | 0.412 | 1.1 | 23 | 74.1 | 0.051 | 2.72 |
| NaOH (1) | extraction | 3.6 | 4.9 | 70 | 1160 | 0.012 | 8.7 |
| $H_2O_2$ | oxidation | 1.05 | 1.7 | 70 | 162 | 0.028 | 4.6 |
| $H_2SO_4$ (pH 3.1–3.3) | acid wash | 0.155 | 0.7 | 6.2 | 36 | 0.045 | 2.54 |
| NaOH (2) | extraction | 3.53 | 4.8 | 70 | 1170 | 0.02 | 6.52 |
| $H_2O_2$ | oxidation | 2.01 | 2.6 | 70 | 155 | 0.03 | 4.72 |
| $H_2SO_4$ (pH 3.1–3.3) | acid wash | 0.27 | 0.9 | 13 | 63 | 0.045 | 3.62 |
| NaOH (2) | extraction | 3.53 | 4.8 | 70 | 1170 | 0.02 | 6.52 |
| Peracetic acid | oxidation/ acid wash | 0.695 | 1.6 | 48 | 80 | 0.042 | 2.9 |
| NaOH (1) | extraction | 3.6 | 4.9 | 70 | 1160 | 0.012 | 8.7 |
| CaOCl | oxidation | 3.58 | 4.4 | 70 | 840 | 0.025 | 5.3 |
| $H_2SO_4$ (pH 3.1–3.3) | acid wash | 2.22 | 3.2 | 70 | 146 | 0.045 | 11.5 |
| Autoclave/$H_2O$ (2) | extraction | 0.551 | 1.3 | 35 | 127 | 0.102 | 5.2 |
| $H_2O_2$ | oxidation | 0.411 | 0.9 | 23 | 41 | 0.025 | 2.88 |
| $H_2SO_4$ (pH 3.1–3.3) | acid wash | 0.07 | 0.3 | 2.2 | 8 | 0.075 | 0.92 |
| Autoclave/$H_2O$ (2) | extraction | 0.551 | 1.3 | 35 | 127 | 0.102 | 5.2 |
| Peracetic acid | oxidation/ acid wash | 0.156 | 0.6 | 6.2 | 27 | 0.044 | 1.8 |
| Fresh UEO Clay (1% dosage) | | 0.237 | 0.8 | 11 | 65 | 0.027 | 5.54 |
| Fresh ACC Clay (0.95% dosage) | | 0.207 | 0.7 | 9.1 | 42 | 0.033 | 2.72 |
| Test Oil (3) | | 3.77 | 5.2 | 70 | 1280 | 0.025 | 3.92 |

* Lovibond Red value
** Lovibond Yellow value
*** Free Fatty Acids value
**** Peroxide value
(1) Fresh clay and spent clay supplied by Universal Edible Oil (UEO), Chicago, IL.
(2) Spent clay supplied by AGP, St. Joseph, MO; fresh clay ACC Clarion 470 SF (acid activated calcium bentonite) with 5% diatomaceous earth filter aid.
(3) Once refined soya oil, Kraft-Humko.

Figure 2:
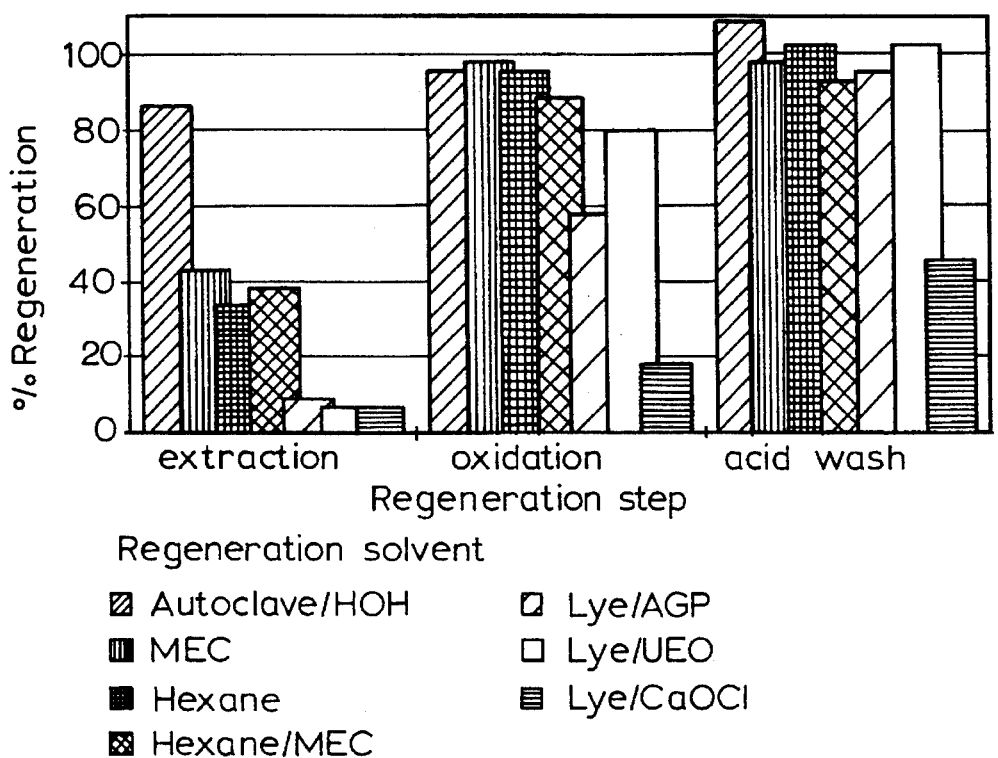
Figure 3:
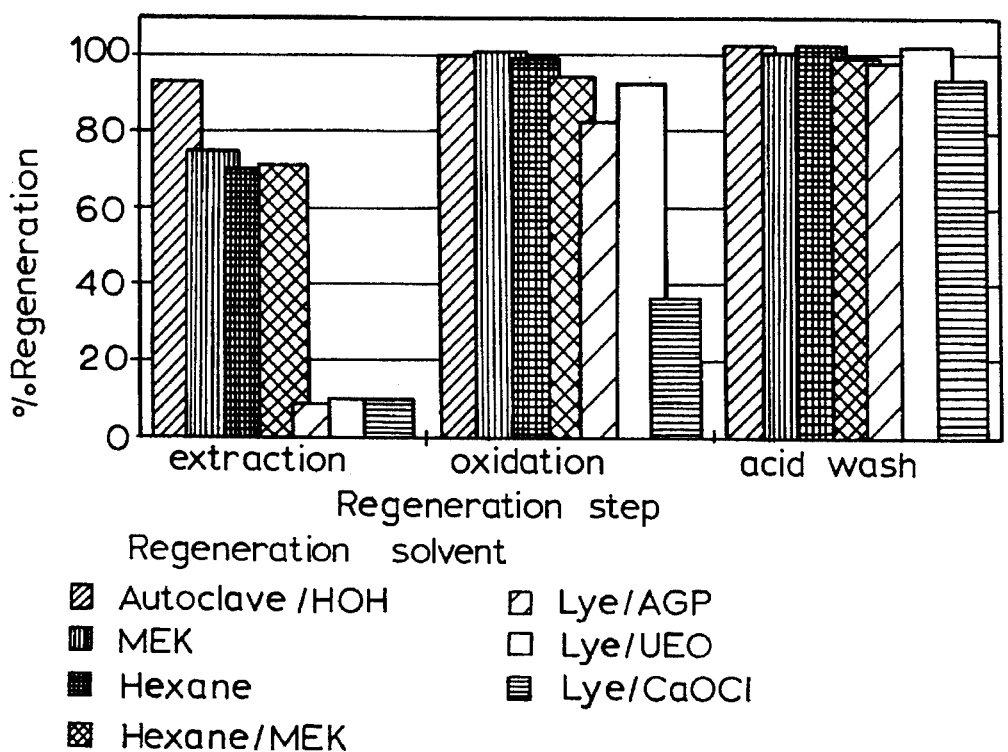

In FIGS. 1–3, the degree of regenerated activity achieved at different stages of the regeneration process, when employing different extraction solvents and oxidants, is assessed by comparing the activity of the regenerated clay for adsorbing the two major color pigments (β-carotene and chlorophyll) to the activity of fresh clay for adsorbing the same pigments. Adsorption of β-carotene is evaluated using the reduction in spectrophotometric absorbance at 470 nm wavelength and using the Lovibond red value obtained by means of an automatic tintometer. Chlorophyll contents (in ppb) of the test and treated oils were determined by means of the automatic tintometer. The percentage regeneration (% activity) achieved for the evaluation parameters in FIGS. 1–3 were calculated in accordance with the following formula:

$$\% \text{ Regeneration} = \frac{100 \times (\text{Test oil value} - \text{Regenerated clay value})}{(\text{Test oil value} - \text{Fresh clay value})}$$

Since, in the case of the peroxides, values obtained using regenerated clays were found sometimes to increase and other times to decrease, the percentage change for the regenerated clays relative to the fresh clay samples also was calculated. Therefore, the percentage increase or decrease in FIG. 4 was calculated by means of the following formula:

$$\% \text{ Decrease or Increase} = \frac{100 \times (\text{Fresh clay value} - \text{Regenerated clay value})}{(\text{Test oil value} - \text{Fresh clay value})}$$

The free fatty acid content of edible and inedible oils treated with acid-activated bleaching earths always increases somewhat due to hydrolysis of some of the ester linkages in the triglyceride (fat) molecules. However, the absolute value of this change is usually quite low (i.e., less than 0.1 wt. % free fatty acids generated) and, therefore, a direct plot of the change in free fatty acid content from data in Table I, was plotted in FIG. 5.

Referring more particularly to the drawings, FIG. 1 illustrates that regeneration for carotene adsorption (470 mm)

increases for each step in the process. Although the aqueous autoclave extraction is the most efficient without the oxidation and acid wash steps, followed by the organic solvents and finally the aqueous lye (NaOH) extraction, the less efficient extraction media, e.g., MEK and hexane, are excellent for regeneration when followed by the oxidation and acid wash steps of the present invention. Clearly, however, the acid wash step is required if regenerated activities near the 100% level, e.g., 98%+, are to be achieved.

Since Lovibond red values are another way for measuring carotene adsorption, it is to be expected, and was found, that the Lovibond red values of FIG. 2 closely parallel the 470 mm absorbance values shown in FIG. 1. Both FIGS. 1 and 2 indicate that the CaOCl oxidant, after NaOH extraction, is not as effective as 30% $H_2O_2$ for the regeneration of carotene adsorption sites.

In FIG. 3, regeneration of chlorophyll adsorption efficiency is plotted as a function of processing step. Although regenerated activities for the autoclave/HOH and organic clay-bleached oils are known to increase in the presence of acidified chloride ions. For reasons which are unclear, peroxide values for the lye-extracted AGP sample, although showing improvement over the course of the treatment, still are higher than would be obtained in the case of a fresh clay.

Figure 5:
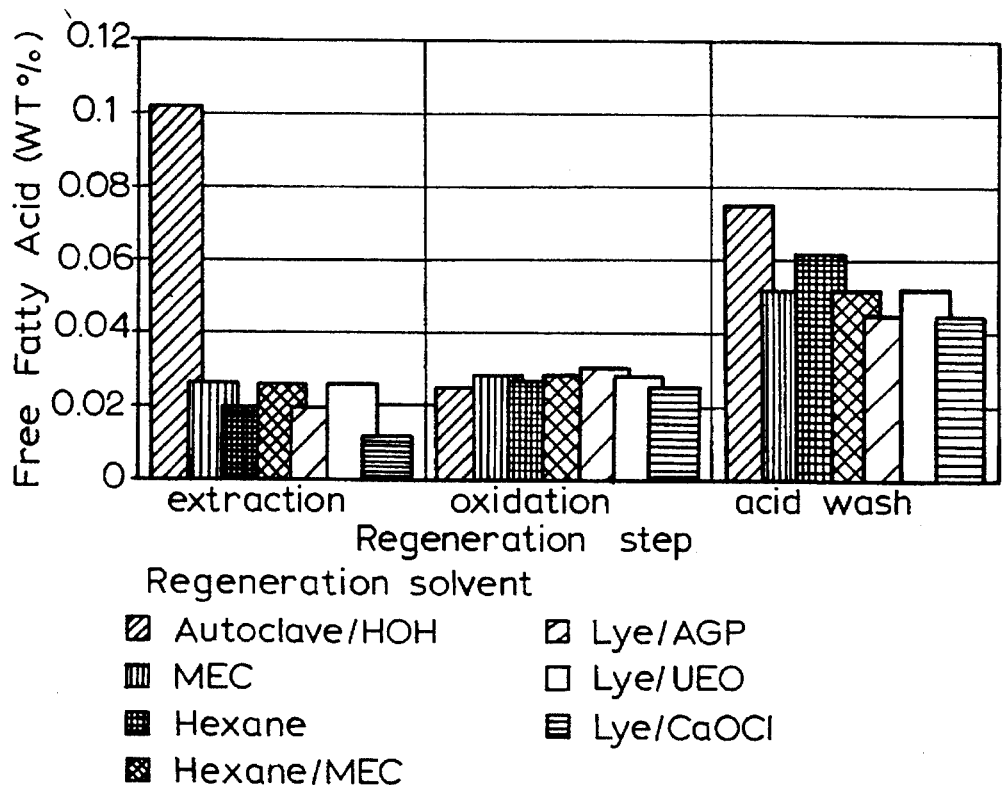

As shown in FIG. 5, the acid washing step increases the tendency for the regenerated clay samples to generate free fatty acids via hydrolysis of the ester linkages of the triglyceride molecules of the oil. Although this effect is less pronounced for the lye-extracted materials, it can be seen that regardless of the extraction medium, increases occur in all cases. Typically, it is desirable that free fatty acids not exceed about 0.07 wt. %, preferably less than about 0.05 wt. % in bleached oil for commercial operations, so it can be seen that all of the oils tested are well within specifications, after oxidation and acid washing.

TABLE III

EFFECT OF STRENGTH OF ACID WASH ON REGENERATION OF AGP SPENT BLEACHING CLAY

| TREATMENT | | BLEACHING PROPERTIES VS. PROCESS STEP (All bleaches at 1% dosage) | | | | | | |
|---|---|---|---|---|---|---|---|---|
| SOLVENT/ REAGENT | STEP | Abs. 470 nm | LvR 1" cell | LvY 1" cell | CHLOROPHYLL ppb | FFA wt % | PV meq/kg | CARBON wt % |
| Hexane | extraction | 2.44 | 3.8 | 70 | 320 | 0.04 | 6.2 | 10.44 |
| $H_2O_2$ | oxidation | 1.17 | 1.9 | 70 | 96 | 0.025 | 4.2 | 0.6 |
| $H_2SO_4$ (1.25%) | acid wash | 0.544 | 1.2 | 35 | 51 | 0.032 | 2.52 | #N/A |
| $H_2SO_4$ (2.50%) | acid wash | 0.549 | 1.2 | 34 | 58 | 0.04 | 2.3 | #N/A |
| $H_2SO_4$ (5.0%) | acid wash | 0.473 | 1.2 | 31 | 54 | 0.047 | 1.9 | #N/A |
| NaOH | extraction | 3.53 | 4.8 | 70 | 1170 | 0.02 | 6.52 | 11.48 |
| $H_2O_2$ | oxidation | 1.77 | 2.7 | 70 | 188 | 0.025 | 4.4 | 3.12 |
| $H_2SO_4$ (1.25%) | acid wash | 0.563 | 1.3 | 35 | 99 | 0.036 | 4.2 | 3.27 |
| $H_2SO_4$ (2.50%) | acid wash | 0.474 | 1.3 | 29 | 93 | 0.038 | 4.06 | 3.41 |
| $H_2SO_4$ (5.0%) | acid wash | 0.366 | 1.1 | 20 | 75 | 0.045 | 3.6 | 3.3 |
| Autoclave/$H_2O$ | extraction | 0.551 | 1.3 | 35 | 127 | 0.102 | 5.2 | 10.46 |
| $H_2O_2$ | oxidation | 0.44 | 1.1 | #N/A | 40 | 0.03 | 3.18 | 0.26 |
| $H_2SO_4$ (1.25%) | acid wash | 0.122 | 0.6 | 4.6 | 14 | 0.042 | 1.54 | 0.26 |
| $H_2SO_4$ (2.50%) | acid wash | 0.116 | 0.6 | 4.4 | 16 | 0.051 | 1.36 | 0.27 |
| $H_2SO_4$ (5.0%) | acid wash | 0.097 | 0.5 | 3.4 | 12 | 0.073 | 0.94 | 0.25 |
| Hi Temp. Burn | 350° C. | 1.47 | 2.9 | 70 | 404 | 0.032 | 5.68 | 7.53 |
| Hi Temp. Burn | 500° C. | 0.405 | 1 | 22 | 75 | 0.038 | 2.4 | 0.68 |
| Hi Temp. Burn | 650° C. | 0.59 | 1.4 | 42 | 133 | 0.035 | 33.2 | 0.11 |
| Spent AGP Clay | | 2.441 | 3.4 | 70 | 334 | #N/A | #N/A | 25.13 |
| Clarion 470 SF (.95% dosage) | | 0.207 | 0.7 | 9.1 | 42 | 0.033 | 2.72 | 0.16 |
| Test Oil (2) | | 3.77 | 5.2 | 70 | 1280 | 0.025 | 3.92 | #N/A |

(1) Spent clay supplied by AGP, St. Joseph, MO; fresh clay ACC Clarion 470 SF (acid-activated calcium bentonite clay having 5% diatomaceous earth filter aid).
(2) Once refined soya oil, Kraft-Humko.

solvent extracted clays are essentially restored to full activity by the time of the oxidation step, and even show some additional improvement as a consequence of acid washing, full activities for the lye-extracted materials are not achieved until after the acid wash step. The CaOCl oxidant seems to work better at restoring chlorophyll adsorption sites, but full activity is still not achieved, even after the acid wash step.

Figure 4:
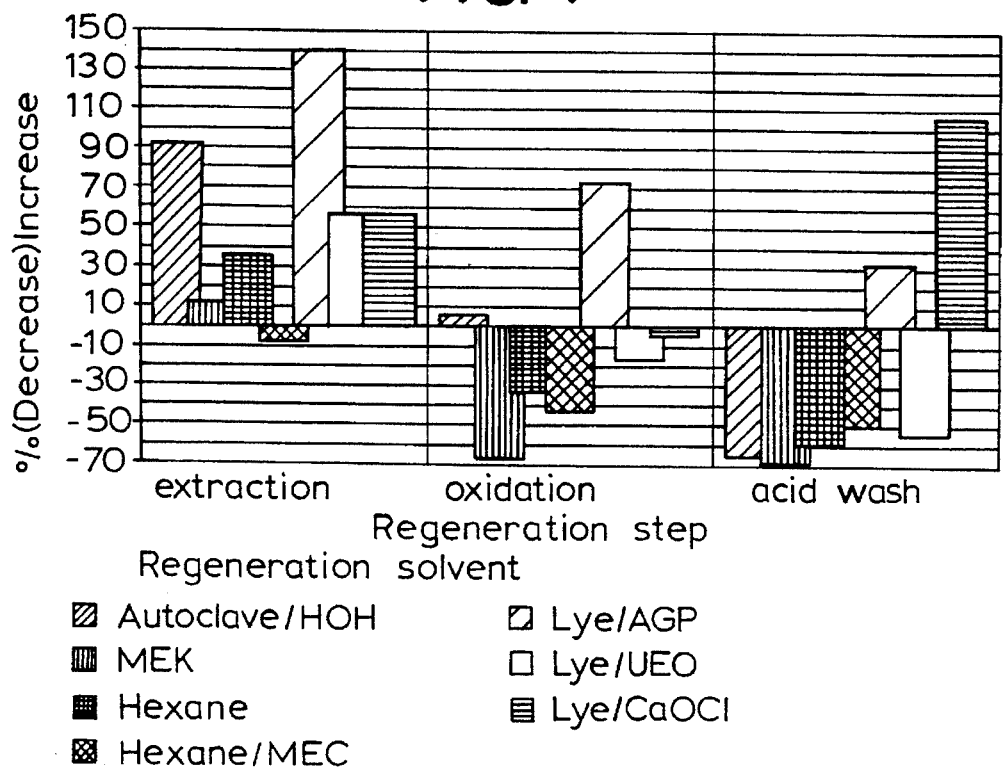

As shown in FIG. 4, peroxide values decrease for each step in the process, the only exception being the CaOCl oxidized sample. Since this graph shows percentage increase or decrease relative to fresh clay, these results indicate that in the majority of cases, peroxide values are even lower (better) by completion of the oxidation step, and are even further improved by the acid wash step, than are usually obtained with a fresh clay. The substantial increase in peroxide value for the CaOCl oxidized material, after the acid wash, is consistent with the fact that peroxide levels for Table III presents data obtained from experiments conducted to regenerate the AGP spent bleaching clay. In these experiments, the degree of acid wash was varied in order to evaluate the effect of the acid wash step on the overall efficacy of the regeneration process. In addition, residual carbon levels on the spent clay versus the different processing steps was also determined. The graphs of FIGS. 6–10 were generated from the data of Table III, and illustrate the effects of the process steps of the process of the present invention. Further, FIGS. 6–10 compare the efficacy of the process of the present invention to a more conventional reactivation accomplished by "burning" the spent clay at three different temperatures: 350° C., 500° C. and 650° C.

Figure 6:
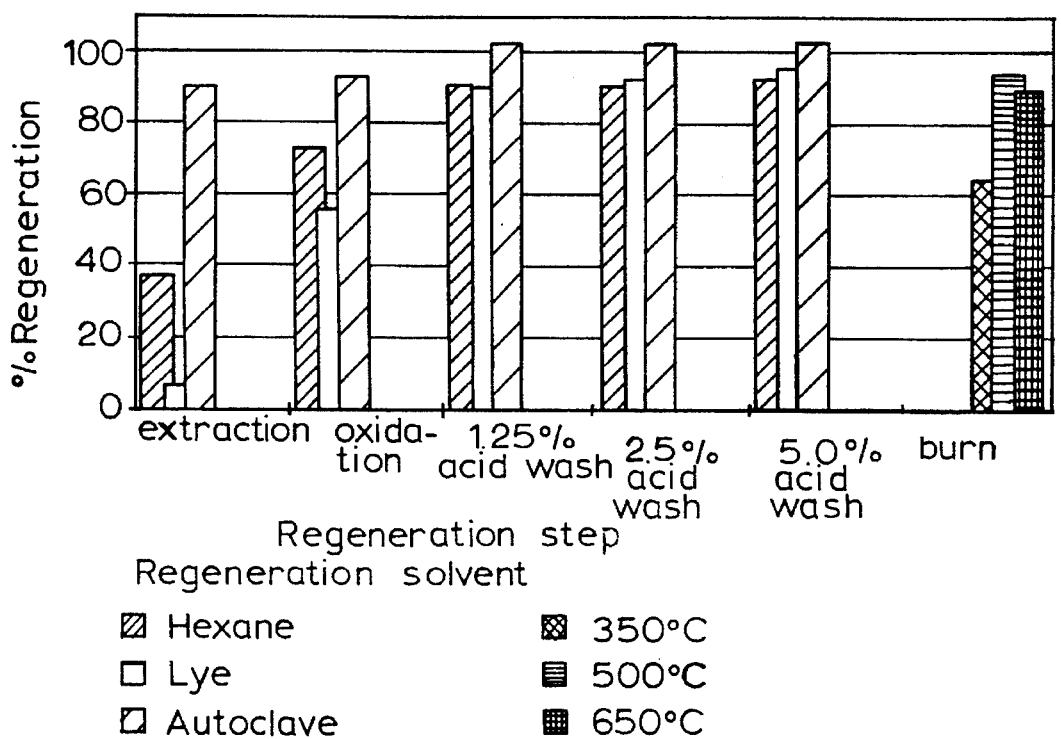
Figure 7:
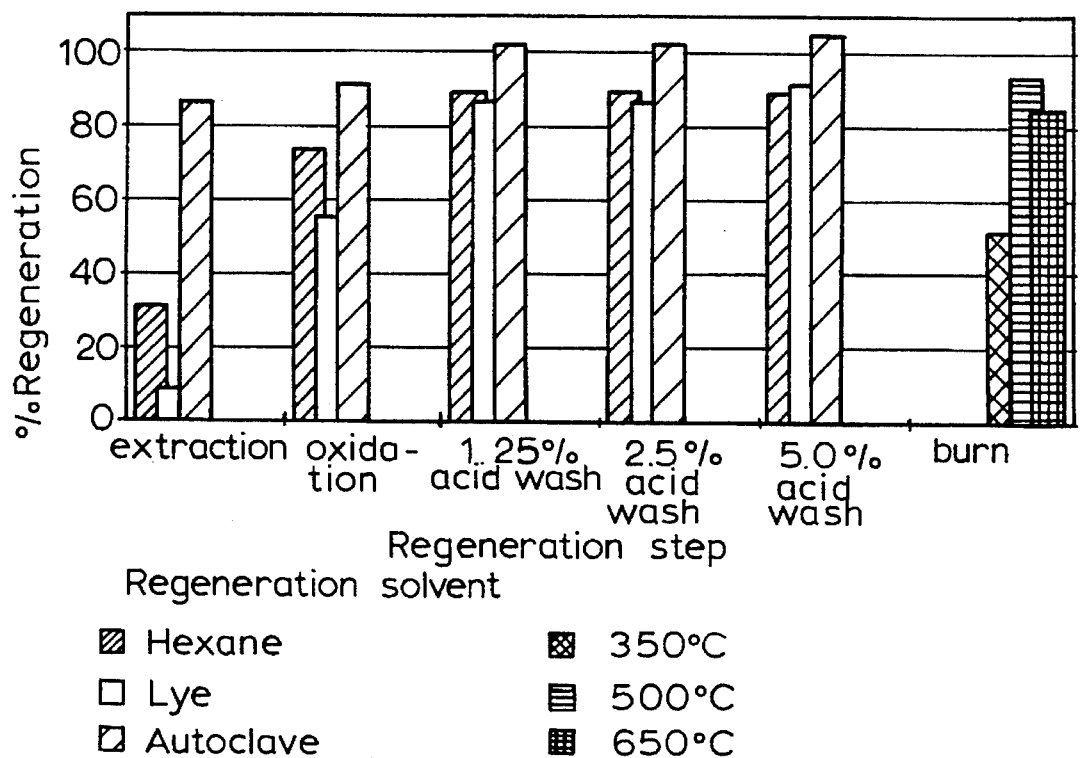

The graph of FIG. 6, in agreement with FIG. 1, shows that the extent of carotene adsorption increases for each step in the process. Changing the strength of the acid wash from 1.25% to 5.0% does little to improve the activity of the hexane and autoclave/HOH-extracted samples, but does improve the regenerated activity of the lye-extracted material. In this set of experiments, the autoclave/HOH-extracted material results in regenerated values in excess of 100%. Also plotted are the regenerated values obtained for spent clays which were simply calcined at three different temperatures. Clearly, the temperature of calcination must be controlled. Best results were obtained when the samples were burned at 500° C.

As previously discussed, Lovibond red values are another way for measuring carotene adsorption. The results of the graph of FIG. 7 therefore, parallel those shown in FIG. 6.

Figure 8:
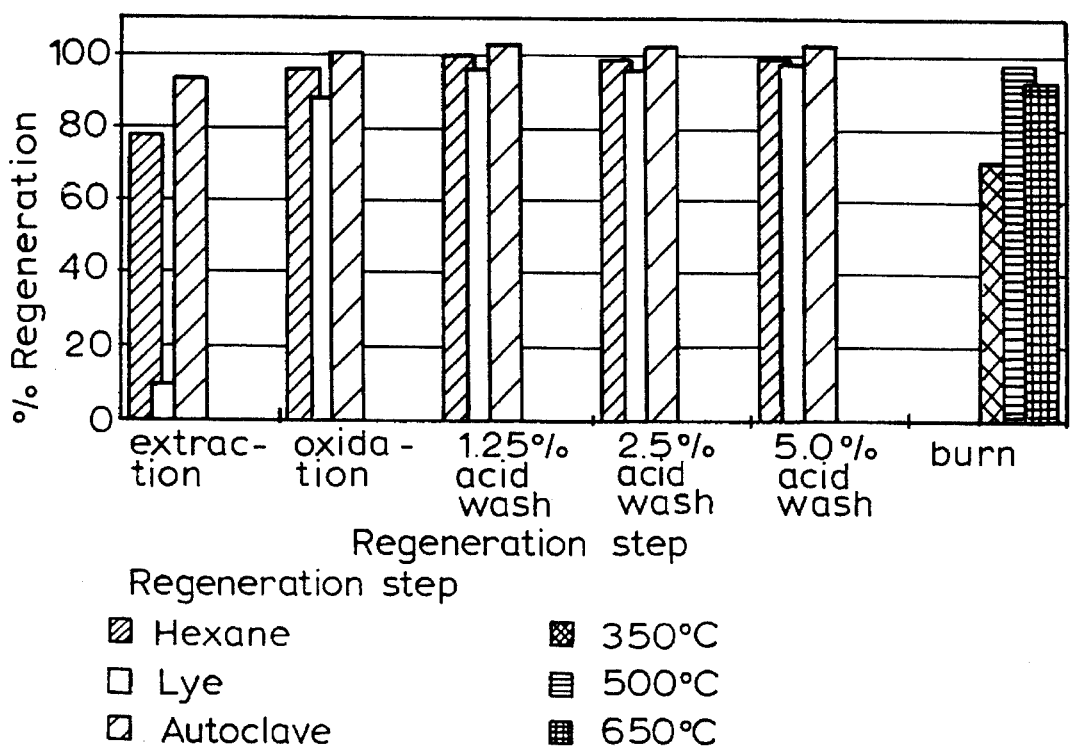

The extent of regenerated chlorophyll adsorption efficiency is plotted in FIG. 8. As with FIG. 6, the lye-extracted sample exhibits the most improvement by increasing the strength of the acid wash, although both the hexane and the autoclave/HOH-extracted samples are also improved somewhat. The burned samples exhibit the same behavior as previously discussed, showing a better regenerated chlorophyll adsorption activity for the sample calcined at the 500° C. mid-range temperature, as opposed to the 350° C. low range or 600° C. high range temperature.

Figure 9:
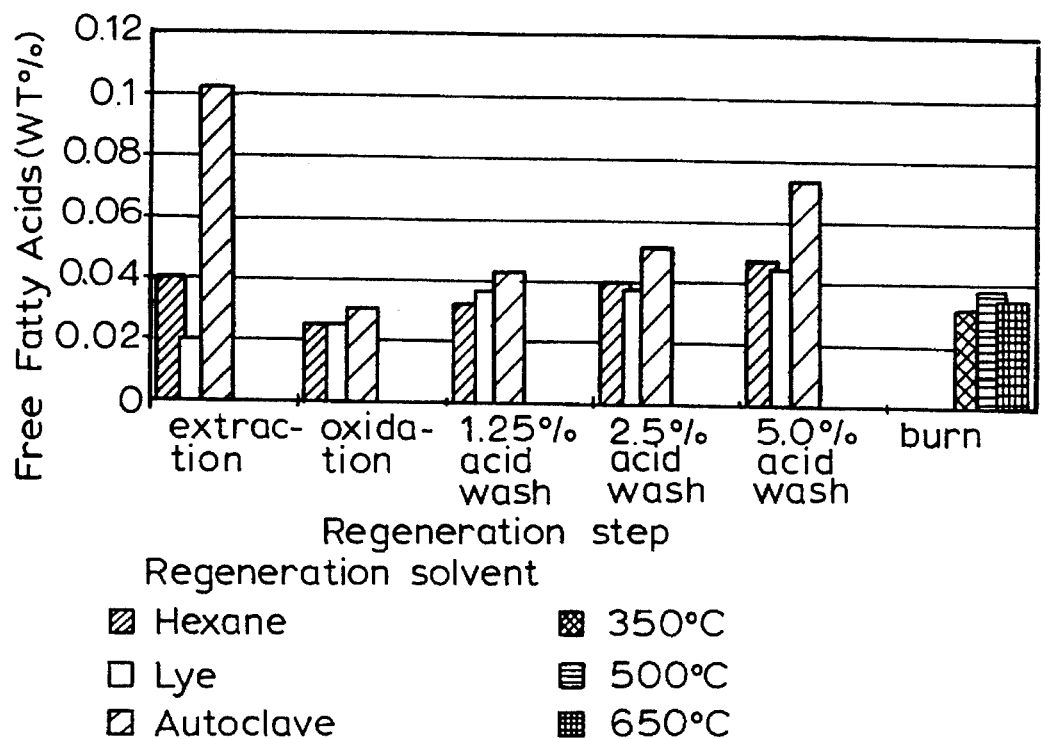

The graph of FIG. 9 shows, as with FIG. 5, that although the acid washing step does increase the generation of free fatty acids, the extent of the increase is relatively small on an absolute basis and is, in any case, well below the 0.07 wt. %, preferably 0.05 wt. %, maximum that is normally tolerated for this parameter in commercial operations.

Figure 10:
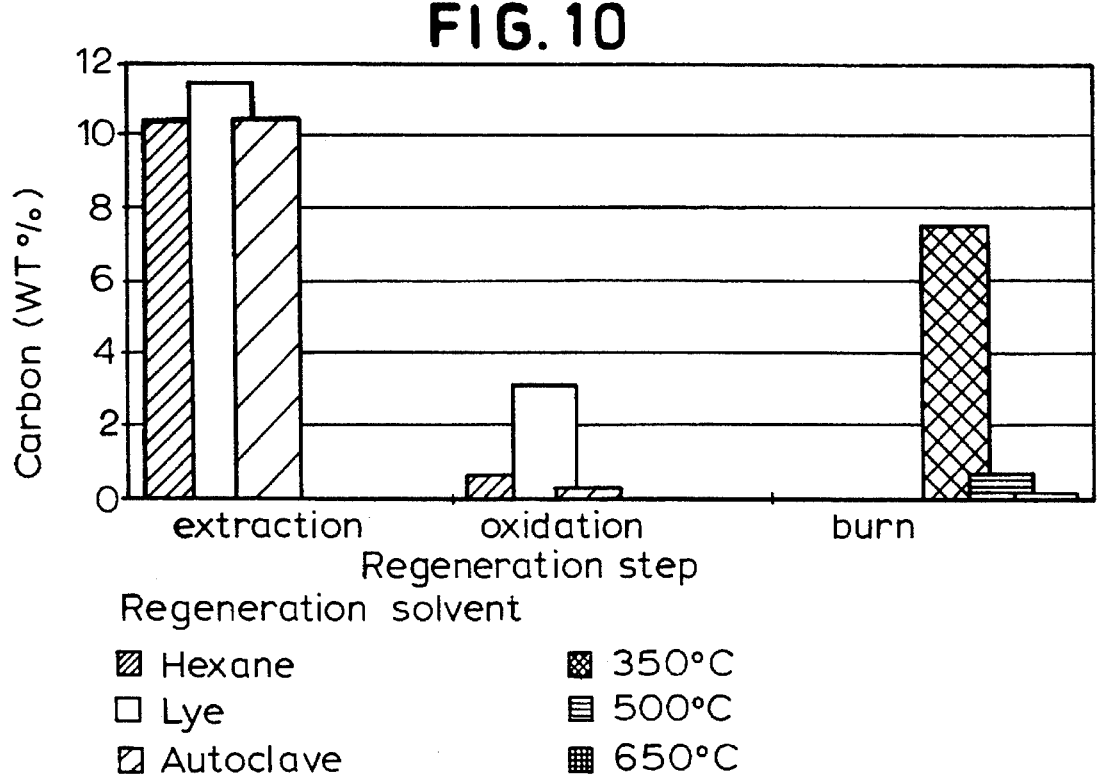

The graph of FIG. 10 simply shows the reduction of carbon content associated with the extraction and oxidation steps in the three step process. Since no further reductions seem to occur after the oxidation step (see Table III), the values for the acid washed materials were not plotted. As expected, calcinations at the higher temperatures yield the lowest residual carbon values for the burned samples.

The three (possibly two) step process of the present invention for regenerating spent acid-activated bentonite bleaching clays possesses numerous technical, economic and procedural advantages over other processes which might be considered for this purpose. They include, but are not restricted to the following: (i) a capability for achieving full (100%) regeneration levels, (ii) the utilization of a totally aqueous system which does not require the use of expensive and flammable organic solvents, (iii) lower production costs (no need to capture volatile organic gases, no need to separate and recycle organic solvents), (iv) lower capital costs (no need to purchase and install expensive explosion proof, capture, separation and distillation systems for safeguarding against fire, for capturing volatile solvents, and for separating and recycling organic solvents. As compared to a process which might employ simple, high-temperature thermal treatment, the process of the present invention has other advantages, including: (v) superior regeneration capability (i.e., in no case is it possible to achieve the 100% regeneration levels required for commercial viability by simple burning), (vi) superior yields of regenerated powders (i.e., finely ground powders are easily carried off with exhaust combustion gases when attempting to regenerate by burning), (vii) superior process control (i.e., regeneration by burning is extremely difficult to control and undercalcination or overcalcination is a common problem), and (viii) superior utilization of by-product waste oil (i.e., at least one-half the entrained oil on the spent clay can be recovered and utilized for other purposes rather than being wasted).

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the process may be varied substantially without departing from the spirit of the invention, and the exclusive use of all modifications which come within the scope of the appended claims is reserved.

What is claimed:

1. Acid-activated bentonite clay that has been regenerated, after oil bleaching by removing a majority of said oil from said acid-activated clay by extraction with water and essentially without an organic solvent, at a temperature of about 80° C. to about 370° C.; and oxidizing said clay, with an aqueous oxidant solution, after said oil removal step, to a degree sufficient such that the capacity to adsorb carotenoids and/or chlorophyll is restored to at least 98% of its original activity for adsorption of carotenoids and/or chlorophyll.

2. The regenerated, acid-activated clay of claim 1, wherein the clay has been oxidized by contact with $H_2O_2$.

3. The regenerated, acid-activated clay of claim 1, wherein the extraction water has a temperature in the range of about 100° C. to about 370° C., at a pressure in the range of about 15 psia to a about 3053 psia in an enclosed vessel.

4. The regenerated, acid-activated clay of claim 3, wherein the extraction water has a temperature in the range of about 150° C. to about 250° C., at a pressure in the range of about 65 psia to about 580 psia.

5. The regenerated, acid-activated clay of claim 1, wherein oil is removed from the spent clay by extraction of the oil with an aqueous solution of an alkali.

6. The regenerated acid-activated clay of claim 1, wherein oxidation is carried out by contact of the acid-activated clay, after the oil removal step, with an aqueous oxidant solution selected from the group consisting of $H_2O_2$, CaOCl, benzoyl peroxide, peracetic acid, perchloric acid, potassium perchlorate, potassium permanganate, potassium peroxymonosulfate, sodium hypochlorite, sodium persulfate, and mixtures thereof.

7. The regenerated, acid-activated clay of claim 1, wherein oxidation is accomplished by washing the clay with an aqueous solution of an acidic oxidant.

8. The regenerated, acid-activated clay of claim 1, wherein the acidic oxidant comprises peracetic acid.

9. The regenerated, acid-activated clay of claim 1, wherein the acid-activated clay is acid washed by contacting the clay, after oil removal and after oxidation, with an acid solution for a time sufficient such that after washing 5.5 grams of the acid washed clay with two 200 milliliter portions of deionized water, the supernatant from the second 200 milliliter water wash has a pH in the range of about 3.0 to about 4.0.

10. The regenerated, acid-activated clay of claim 9, wherein the pH of the supernatant, after the second 200 milliliter water wash, is in the range of about 3.1 to about 3.3.

11. The regenerated, acid-activated clay of claim 10, wherein the acid is selected from the group consisting of hydrochloric acid and sulfuric acid.

12. A regenerated, acid-activated smectite clay, regenerated by removal of hydrocarbon impurities by removing a majority of the hydrocarbons from said spent acid-activated smectite clay by extraction with essentially water, and without an organic solvent, at a temperature in the range of about 80° C. to about 370° C.; and oxidizing with an aqueous oxidant and acid washing said clay with an aqueous solution to a degree sufficient such that the clay is restored essentially completely to its acid-activation activity.

13. The regenerated, acid-activated clay of claim 12, wherein oxidation is carried out by contact of the acid-activated clay, after the oil removal step, with an aqueous oxidant solution selected from the group consisting of $H_2O_2$, CaOCl, benzoyl peroxide, peracetic acid, perchloric acid, potassium perchlorate, potassium permanganate, potassium peroxymonosulfate, sodium hypochlorite, sodium persulfate, chlorine and mixtures thereof.

14. The regenerated, acid-activated clay of claim 12, wherein oxidation has been accomplished by washing the clay with an aqueous solution of an acidic oxidant.

15. The regenerated, acid-activated clay of claim 14, wherein the acidic oxidant comprises peracetic acid.

16. The regenerated, acid-activated clay of claim 12, wherein the acid-activated clay is acid washed by contacting the clay with an acid solution for a time sufficient such that after washing 5.5 grams of the clay with two 200 milliliter portions of deionized water, the supernatant from the second 200 milliliter water wash has a pH in the range of about 3.0 to about 4.0.

17. The regenerated, acid-activated clay of claim 16, wherein the pH of the supernatant, after the second 200 milliliter water wash, is in the range of about 3.1 to about 3.3.

18. The regenerated, acid-activated clay of claim 17, wherein the acid is selected from the group consisting of hydrochloric acid, sulfuric acid, and mixtures thereof.

* * * * *

UNITED STATES PATENT AND TRADEMARK OFFICE
CERTIFICATE OF CORRECTION

PATENT NO.   : 5,468,701
DATED        : November 21, 1995
INVENTORS    : NEBERGALL ET AL.

It is certified that error appears in the above-identified patent and that said Letters Patent is hereby corrected as shown below:

Column 4, lines 31 and 32, delete "08/022,273, filed Jan. 24, 1993" and substitute therefor -- 08/011,273 filed Jan. 29, 1993 --.

Column 9, line 17, delete " ⇋ " and substitute therefor -- ⇒ --.

Column 9, line 19, delete "↑" and substitute therefor -- ⇒ --.

Column 12, Table II, sixth column, 15th line from bottom, delete "155" and substitute therefor -- 255 --.

Column 13, Table III, third column, 3rd line from bottom, delete "2.441" and substitute therefor -- 2.44 --.

Signed and Sealed this

Twenty-ninth Day of April, 1997

Attest:

BRUCE LEHMAN

Attesting Officer

Commissioner of Patents and Trademarks